(12) United States Patent
Chester

(10) Patent No.: US 11,252,940 B2
(45) Date of Patent: Feb. 22, 2022

(54) GRAZING MUZZLE COMPRISING IN INTERCHANGEABLE NOSE INSERTS

(71) Applicant: GG Equine, LLC, Durham, NC (US)

(72) Inventor: April Chester, Durham, NC (US)

(*) Notice: Subject to any disclaimer, the term of this patent is extended or adjusted under 35 U.S.C. 154(b) by 88 days.

(21) Appl. No.: 16/987,825

(22) Filed: Aug. 7, 2020

(65) Prior Publication Data

US 2021/0037788 A1  Feb. 11, 2021

Related U.S. Application Data

(60) Provisional application No. 62/884,800, filed on Aug. 9, 2019.

(51) Int. Cl.
*A01K 25/00*      (2006.01)

(52) U.S. Cl.
CPC .................... *A01K 25/00* (2013.01)

(58) Field of Classification Search
CPC ...................................... A01K 25/00
See application file for complete search history.

(56) References Cited

U.S. PATENT DOCUMENTS

| | | | | |
|---|---|---|---|---|
| 368,430 A | * | 8/1887 | Spooner | A01K 25/00 119/831 |
| 432,317 A | * | 7/1890 | Lowe | A01K 25/00 119/831 |
| 2015/0257368 A1 | * | 9/2015 | Harman | A01K 25/00 119/832 |
| 2019/0389719 A1 | * | 12/2019 | Gerhardt | A01K 25/00 |

FOREIGN PATENT DOCUMENTS

DE          29904089 U1  * 12/1999  ............. A01K 25/00

* cited by examiner

*Primary Examiner* — Monica L Barlow
*Assistant Examiner* — Brittany A Lowery
(74) *Attorney, Agent, or Firm* — Dogwood Patent and Trademark Law; Ashley D. Johnson

(57) ABSTRACT

The presently disclosed subject matter is generally directed to a slow feeder grazing muzzle for use with animals, such as horses. Slow feeder grazing muzzles fit over at least a portion of the animal's nose and mouth, affecting the amount of grass or other feed that is accessible to the animal. The disclosed muzzle includes a top flap, bottom flap, and opposing side flaps that are capable of interconnecting with each other to form a central opening. In addition, a series of interchangeable inserts can be positioned within the central opening to adjust the amount of grass or feed the horse can access. In this way, the rate of speed and amount of grass the horse eats can be controlled and/or adjusted as desired by the owner.

20 Claims, 21 Drawing Sheets

PRIOR ART

35

GRAZING MUZZLE COMPRISING IN INTERCHANGEABLE NOSE INSERTS

CROSS-REFERENCE TO RELATED APPLICATIONS

This application claims priority to U.S. Provisional Patent Application No. 62/884,800 filed Aug. 9, 2019, the entire contents of which are incorporated by reference herein.

TECHNICAL FIELD

The presently disclosed subject matter is directed to a slow feeder muzzle comprising a plurality of interchangeable nose inserts.

BACKGROUND

In the wild, horses chew their food slowly and thoroughly and therefore do not overeat. However, domesticated horses commonly eat too fast due to long periods of inactivity in their stalls and limited grazing time. The satiety receptors in horses are located in their chewing muscles, not in their stomachs. As a result, it is essential that a horse feed slowly but regularly. If the horse eats too quickly, the animal will not feel full and will overeat. Fast eating by a horse can result in result in potentially harmful side effects, such as "choke" or esophageal obstruction. Slowing down the rate that horses can access food (such as grass, hay, or grain) results in slower digestion which is imperative to allow vital nutrients in the feed to be absorbed much more efficiently. In addition, slow feeder muzzles can help with weight management and prevent or slow the onset of insulin resistance in horses. Slow feeder muzzles have commonly been used to slow the rate of feeding to replicate constant foraging, thereby stimulating the animal's natural digestion. However, prior art slow feeder muzzles are limited to a single nose pattern, allowing only a preset pattern and amount of food access for the horse. As a result, a secondary slow feeder is required when the animal's nutritional needs change. It would therefore be beneficial to provide a safe and effective slow feeder muzzle that overcomes the shortcomings of the prior art.

SUMMARY

In some embodiments, the presently disclosed subject matter is directed to a slow feeding muzzle for an animal. Particularly, the muzzle comprises a plurality of flaps, each flap comprising a main body, a top edge, a bottom edge, and opposing side edges. The muzzle further includes connectors positioned between the side edges of each flap to join adjacent flaps together, and an open nose configured adjacent to the bottom edges of the flaps. The muzzle comprises a plurality of interchangeable inserts sized and shaped such that a single insert fits within the open nose, wherein each insert comprises a top edge, bottom edge and opposing side edges and a main body that includes one or more apertures. Each flap bottom edge is releasably connectable to a corresponding insert bottom edge to allow the insert to be attached and removed on demand.

In some embodiments, the animal is selected from a horse, donkey, mule, goat, sheep, dog, cow, or bull.

In some embodiments, at least one flap comprises one or more openings that pass through the main body of the flap.

In some embodiments, the bottom edge of at least one flap comprises a hinge, groove, interlocking joint, clasp, clip, or tie that releasably connects with at least one edge of the insert.

In some embodiments, the inserts are constructed from one or more food safe materials, selected from aluminum, stainless steel, low density polyethylene, thermoplastic, rubber, silicone, or combinations thereof.

In some embodiments, the apertures vary with regard to shape, size, or both.

In some embodiments, at least one insert comprises a lip extending around at least a portion of the perimeter of the main body.

In some embodiments, at least one edge of the insert comprises a hinge, groove, interlocking joint, clasp, clip, or tie.

In some embodiments, the connectors are constructed from a flexible material.

In some embodiments, the presently disclosed subject matter is directed to a kit. Particularly, the kit comprises a slow feeder muzzle, the muzzle comprising a plurality of adjoined flaps, each flap comprising a main body, a top edge, a bottom edge, and opposing side edges. The muzzle includes a plurality of connectors, each joining two adjacent flaps, wherein the adjoined flaps provide an open nose configured adjacent to the bottom edges of the flaps. The kit includes a plurality of interchangeable inserts sized and shaped to fit within the open nose, wherein each insert comprises a top edge, bottom edge and opposing side edges and a main body that includes one or more apertures. Each flap bottom edge is releasably attachable to a corresponding insert edge to allow the insert to be attached and removed from the open nose on demand.

In some embodiments, the inserts are constructed from one or more food safe materials, selected from aluminum, stainless steel, low density polyethylene, thermoplastic, rubber, silicone, or combinations thereof.

In some embodiments, at least one edge of the insert comprises a hinge, groove, interlocking joint, clasp, clip, or tie.

In some embodiments, the connectors are constructed from a flexible material.

In some embodiments, at least one flap comprises one or more openings that pass through the main body.

In some embodiments, the kit further comprises one or more plugs that releasably fit within at least one insert aperture.

In some embodiments, the presently disclosed subject matter is directed to a method of adjusting the amount of food accessible to an animal. Particularly, the method comprises inserting a slow feeder muzzle on the animal. The muzzle comprises a plurality of flaps, each flap comprising a main body, a top edge, a bottom edge, and opposing side edges. The muzzle further includes a plurality of connectors, wherein each connector joins two adjacent flaps at the flap side edges. The muzzle comprises an interchangeable insert comprising a top edge, bottom edge and opposing side edges and a main body that includes one or more apertures. Each edge of the insert releasably attaches to a bottom flap edge to allow the insert to be attached and removed on demand. The method includes allowing the animal to feed, wherein the amount of food accessible to the animal is determined by the number, size, shape, and position of the apertures in the insert. The amount of food accessible to the animal can be adjusted by interchanging inserts with a desired aperture pattern.

In some embodiments, the bottom edge of each flap comprises a hinge, groove, interlocking joint, clasp, clip, or tie.

In some embodiments, at least one flap comprises one or more openings that pass through the main body.

In some embodiments, the inserts are constructed from one or more food safe materials, selected from aluminum, stainless steel, low density polyethylene, thermoplastic, rubber, silicone, or combinations thereof.

In some embodiments, the connectors are constructed from a flexible material.

BRIEF DESCRIPTION OF THE DRAWINGS

The previous summary and the following detailed descriptions are to be read in view of the drawings, which illustrate some (but not all) embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a muzzle" can include a plurality of such muzzles, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 1:
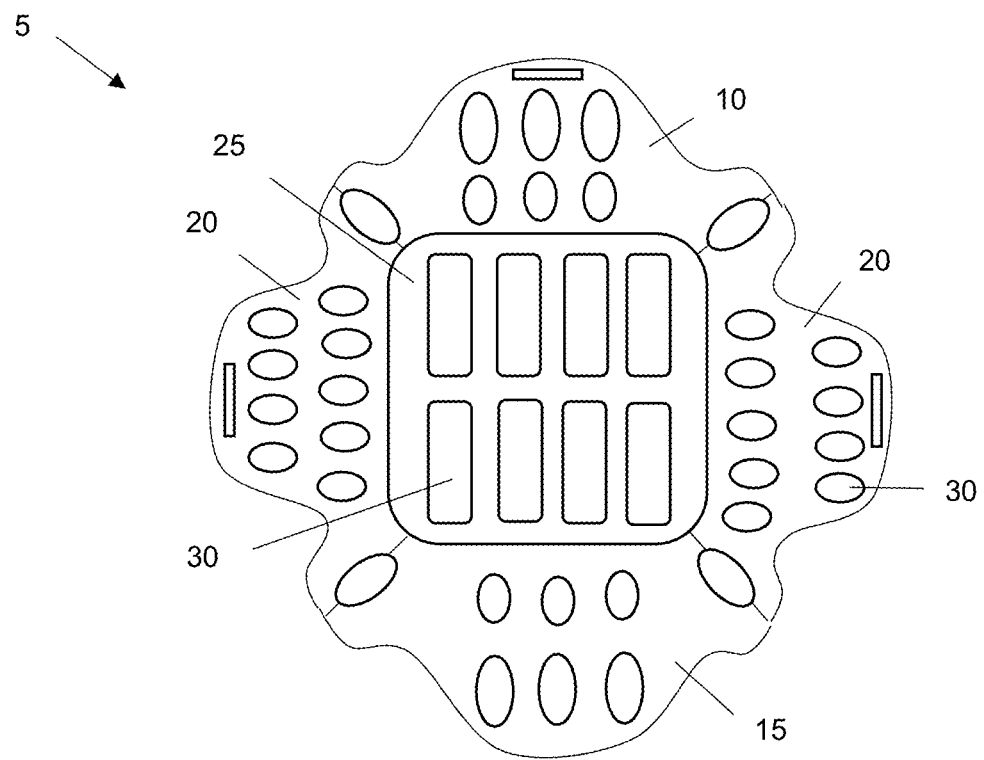
FIG. 1 is a top plan view of one embodiment of a prior art slow feeder muzzle.

The presently disclosed subject matter is generally directed to a slow feeder grazing muzzle for use with animals, such as horses. The term "slow feeder grazing muzzle" refers to a device worn by horses or other animals that fits over at least a portion of the animal's nose and mouth, affecting the amount of grass or other feed that is accessible to the animal. FIG. 1 illustrates one embodiment of prior art slow feeder muzzle 5 that includes front flap 10, rear flap 15, and a pair of side flaps 20 permanently joined to nose 25. The term "nose" refers to the central portion of the muzzle, which can be in contact with the animal's nose and/or mouth. As shown, the nose includes one or more openings 30 through which the animal can access and eat grass or other feed. The top, bottom, and side flaps include additional openings 30 that allow the animal to breathe effectively while wearing the muzzle.

Figure 2A:
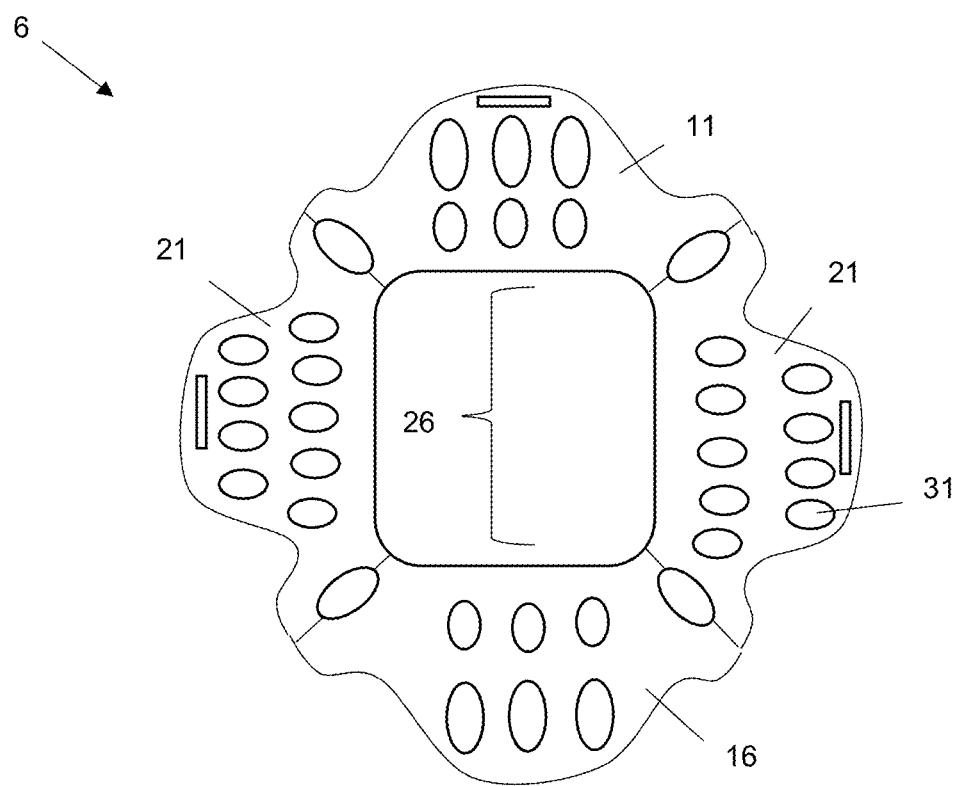
FIG. 2a is a top plan view of a slow feeder muzzle in accordance with some embodiments of the presently disclosed subject matter.
Figure 2B:
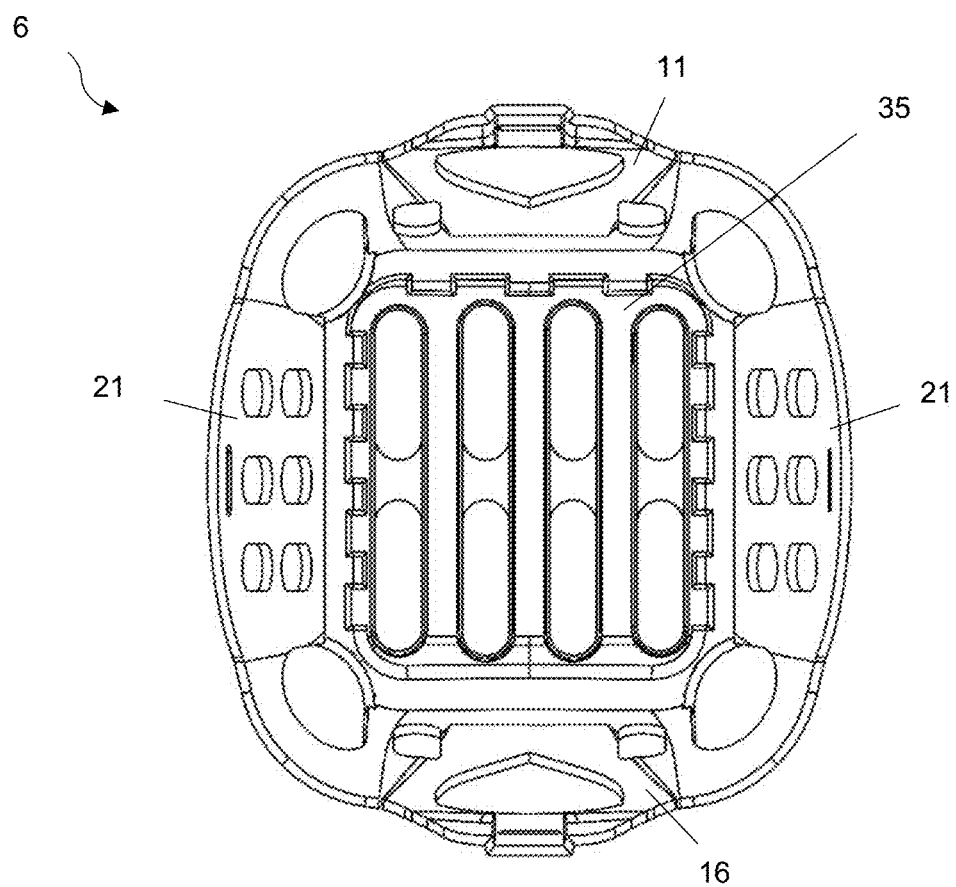
FIG. 2b is a top plan view of a slow feeder muzzle with an attached insert in accordance with some embodiments of the presently disclosed subject matter.

FIG. 2a illustrates one embodiment of the disclosed slow feed grazing muzzle 6. Particularly, muzzle 6 includes front flap 11, rear flap 16, and opposing side flaps 21 that are capable of interconnecting with each other. As shown in FIG. 2b, a series of interchangeable inserts 35 can be positioned within central open nose 26 to adjust the amount of grass or feed the horse has access to. In this way, the rate of speed and amount of grass the horse eats can be controlled and/or adjusted as desired by the owner.

Figure 3A:
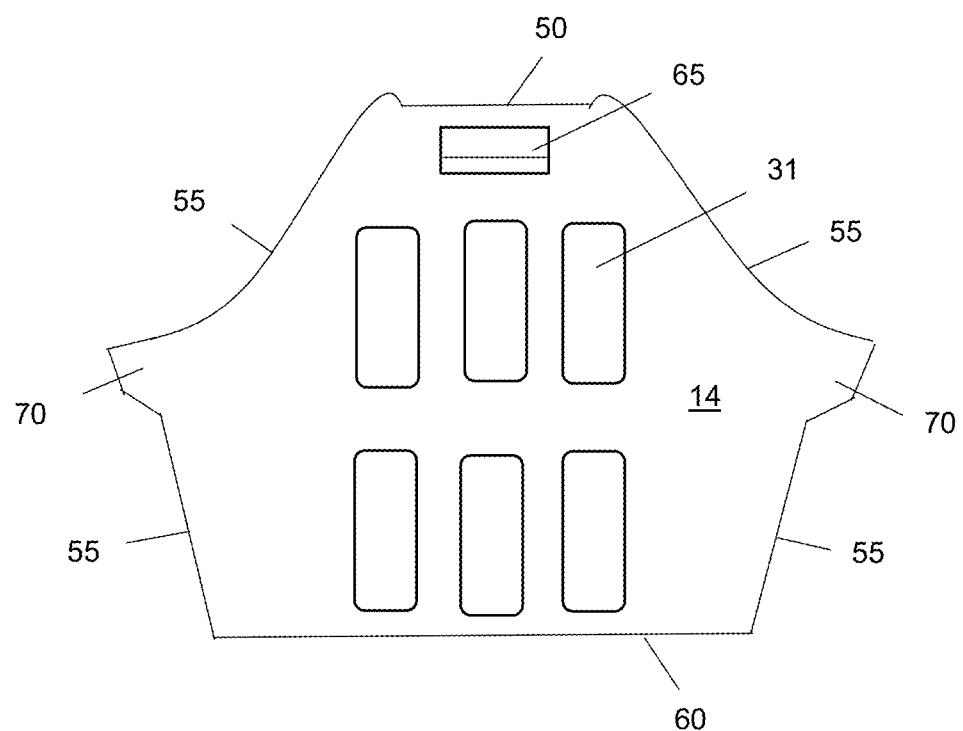
FIG. 3a is a top plan view of a flap that can be used with the muzzle of FIG. 2 in accordance with some embodiments of the presently disclosed subject matter.

FIG. 3a illustrates one embodiment of a representative flap (e.g., flap 11, 16, or 21) that can be used with muzzle 6. As shown, the flap includes central body 14 defined by top edge 50, side edges 55, and bottom edge 60. It should be appreciated that the shape of the flap is not limited to the configuration shown in FIG. 3a. Rather, each flap can be constructed in any desired shape and/or size. For example, the flap can be curved or angled from the top edge to the side edges and/or from the bottom edge to the side edges.

In some embodiments, the flap can include link 65 positioned at or near top edge 50 of one or more flaps (e.g., front flap 11, rear flap 16, and/or side flaps 21). The link allows the muzzle to be releasably attached to the animal's head, such as by looping straps therethrough. The link also allows the muzzle to fit upon animals with heads and/or noses of different sizes and shapes. Link 65 can have any known design, such as (but not limited to) the use of straps, slots, hooks, clasps, VELCRO®, magnets, pins, bars, or other fastening elements.

Figure 3B:
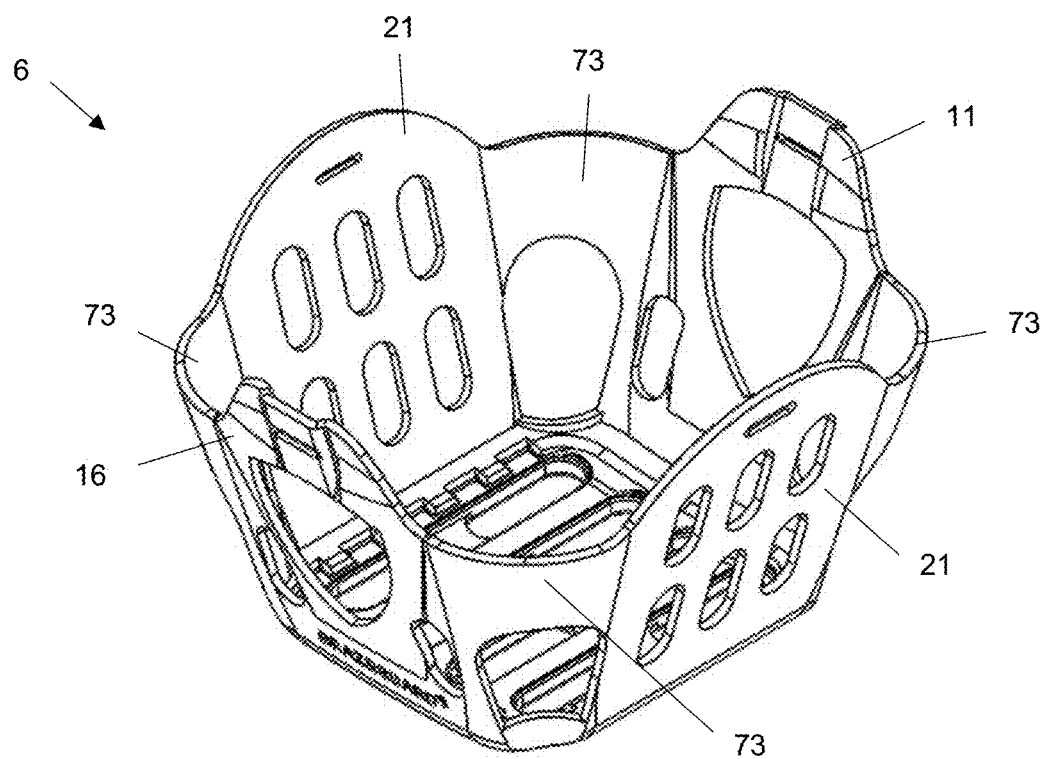
FIG. 3b is a perspective view of a muzzle in accordance with some embodiments of the presently disclosed subject matter.

Each side 55 of the flap can include locking tab 70 disposed thereon. The locking tab releasably or permanently attaches with a corresponding locking tab on an adjacent flap. However, any mechanism can be used to releasably attach locking tabs, such as the use of mechanical closures (clips, pins, clasps), adhesive, welding, ties, straps, buckles, VELCRO®, grooves, snap-fit arrangement, and the like. For example, FIG. 3b illustrates one embodiment of muzzle 6 comprising a series of flaps that are permanently joined together via connectors 73. The term "connector" refers to any element that joins two flaps together. In some embodiments, a connector can attach to a side edge of two adjacent flaps.

Body 14 of each flap optionally includes one or more openings 31 that allow the horse to breathe effectively when the muzzle is worn. The openings also serve to provide the muzzle with a lightweight quality during use. Openings 31 can be configured in any desired shape, such as (but not limited to) circular, oval, square, rectangular, triangular, star, diamond, clover, pentagonal, hexagonal, octagonal, abstract, and the like. In addition, the body of each flap can include any desired number of openings 31 (e.g., 0 to 100 or more). In some embodiments, openings 31 are each configured in about the same size and shape. However, the presently disclosed subject matter also includes embodiments wherein one or more openings 31 have variable sizes and/or shapes.

Figure 3C:
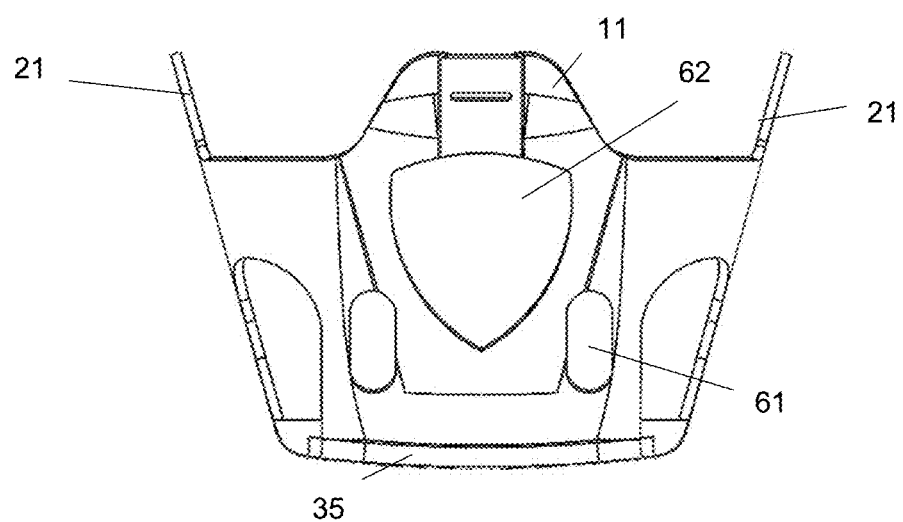
FIG. 3c is a side plan view of a muzzle in accordance with some embodiments of the presently disclosed subject matter.

For example, front and/or rear flaps 11, 16 can include chin opening 62 to accommodate an animal's chin when the muzzle is worn, as shown in FIG. 3c. Particularly, the chin opening can have any desired shape, such as (but not limited to) rectangular, square, oval, circular, shield-shaped, and the like. The chin opening can span about 20-60 percent of the total surface area of the flap (e.g., 20, 25, 30, 35, 40, 45, 50, 55, or 60 percent). In this way, the chin of the animal (e.g., horse) can at least partially extend through the opening, thereby reducing the incidence of skin chafing against the solid portions of the flap.

Bottom edge 60 of each flap forms one side of central opening 26. To this end, in some embodiments, bottom edge 60 can be a straight edge (e.g., to form a square or rectangular-shaped opening). However, the bottom edge can be curved or non-linear in some embodiments. As described in more detail below, bottom edge 60 of each flap can include an element to allow releasable connection with a grazing insert, such as (but not limited to) a hinge, groove, interlocking joints, and the like.

The flaps can be constructed from any desired material. Thus, in some embodiments, the flaps can be constructed from rigid or semi-rigid metal (e.g., aluminium, stainless steel), polymeric material (polyethylene, polypropylene, polystyrene, polyvinyl chloride, synthetic rubber, neoprene, nylon, polyacrylonitrile, PVB, silicone), thermoplastic material (e.g., polyolefin, poly(methyl methacrylate), acrylonitrile butadiene styrene, nylon, polylactic acid, polybenzimidazole, polycarbonate, polyether sulfone, polyoxymethylene, polyetherether ketone, polyetherimide, polyethylene, polystyrene, polyvinyl chloride, TEFLON®), rubber, fabric, or combinations thereof. Advantageously, the rigid or semi-rigid material maintains the shape of the muzzle flaps during use, such as when the horse feeds. However, the flaps are not limited and can be constructed from rubber, silicone, or any other flexible material.

In some embodiments, at least a portion of one or more flaps, tabs, or connectors can be constructed from at least one pliable material, such as fabric, cloth, leather, nylon, and the like, providing an added safety feature. Particularly, if the muzzle were to get caught on an object while the animal is wearing it, the force exerted on the muzzle is more likely to break in the pliable portions and release the animal. As a result, the muzzle will still remain on the horse, even if a portion of the muzzle is damaged.

The flap body can have any desired thickness, such as about 0.01-1 inches. Thus, body 14 can have a thickness of at least about (or no more than about) 0.01, 0.05, 0.1, 0.2, 0.3, 0.4, 0.5, 0.6, 0.7, 0.8, 0.9, or 1 inches. However, the presently disclosed subject matter is not limited and body 14 can have a thickness greater or smaller than the range set forth herein.

Body 14 can be constructed using any known method, such as (but not limited to) plastic thermoforming, flow molding, welding, pressing, and the like. Further, openings 31 can be constructed using any conventional method, such as laser cutting, drilling, die cutting, stamping, water jet cutting, carving, or any other suitable process. Such methods are well known in the art.

Figure 4A:
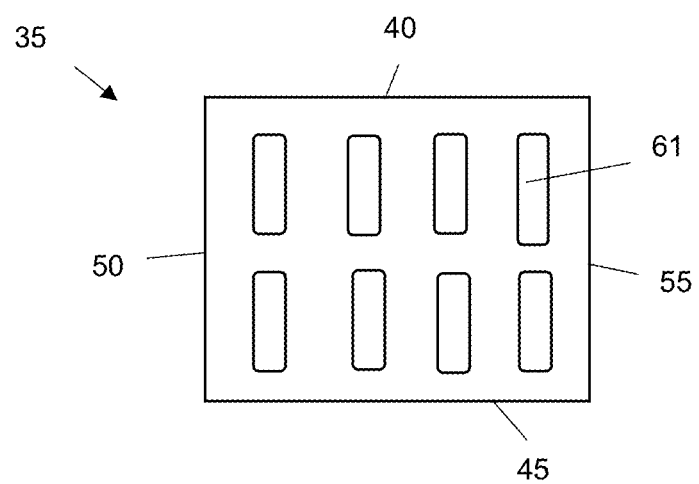
FIGS. 4a-4h are top plan views of nose inserts that can be used with a slow feeder muzzle in accordance with some embodiments of the presently disclosed subject matter.
Figure 4B:
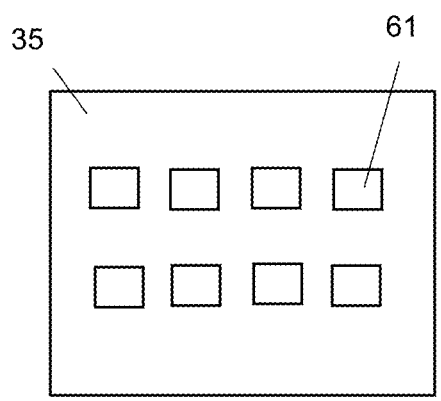
Figure 4C:
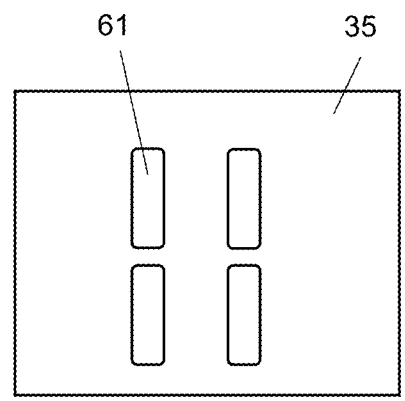
Figure 4D:
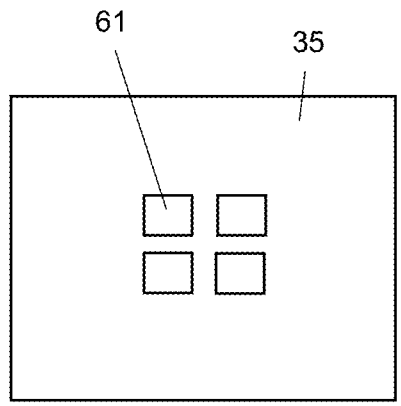
Figure 4E:
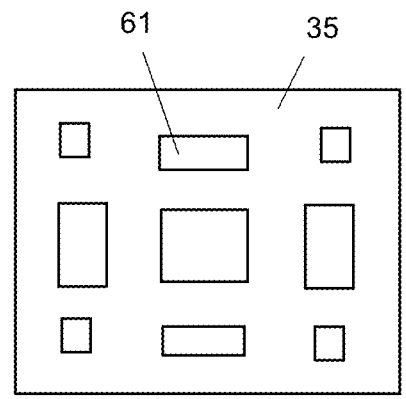
Figure 4F:
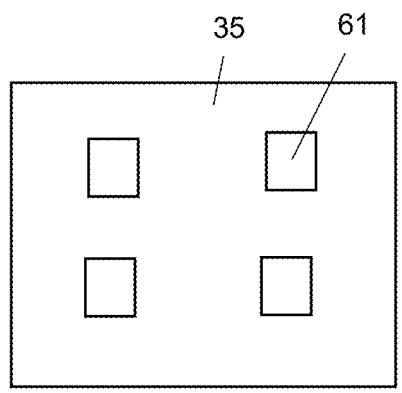
Figure 4G:
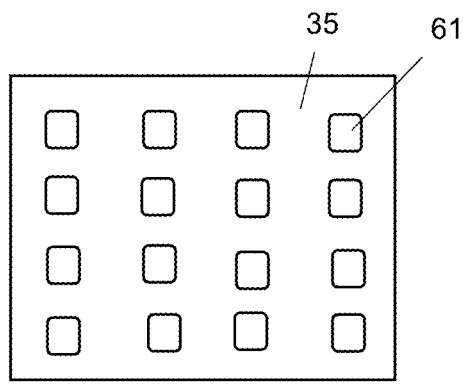

As referenced above, one or more inserts can be positioned within central nose 26 of muzzle 6. FIG. 4a illustrates one embodiment of insert 35 configured in a rectangular shape, comprising opposing top and bottom edges 40, 45 and opposing left and right edges 50, 55. However, the presently disclosed subject matter is not limited and insert 35 can be constructed in any desired shape, such as square, rectangular, circular, oval, triangular, star, clover, abstract, octagonal, hexagonal, pentagonal, and the like. Thus, insert 35 can be constructed in any shape, so long as it fits within nose 26 of the muzzle body.

Figure 4H:
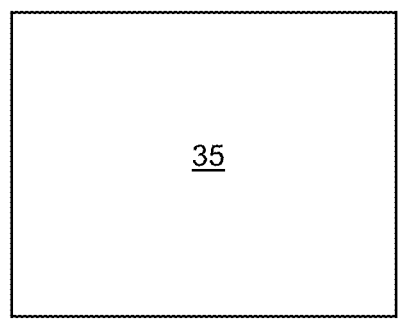

Each insert includes one or more apertures 61 that extend through the central opening. The apertures can be spaced apart a desired distance to permit an animal to pull grass or other feed into the interior of the muzzle for eating. The apertures can have any desired shape, such as (but not limited to) circular, square, oval, rectangular, star, diamond, clover, triangular, pentagonal, hexagonal, octagonal, abstract, and the like. Further, the apertures can be configured in a variety of different shapes and sizes on a single insert. FIGS. 4b-4g illustrate several inserts with alternate aperture designs. Each aperture design allows differing amounts of grass or feed to be accessed by the horse. Further, insert 35 can be constructed without apertures in embodiments wherein the animal is to be prevented from eating, as shown in FIG. 4h. By choosing from a variety of inserts, owners can select which insert works best based on an animal's nutritional needs. It should be appreciated that the aperture design of insert 35 is not limited to those shown in the Figures, and any desired aperture pattern can be used.

Figure 5A:
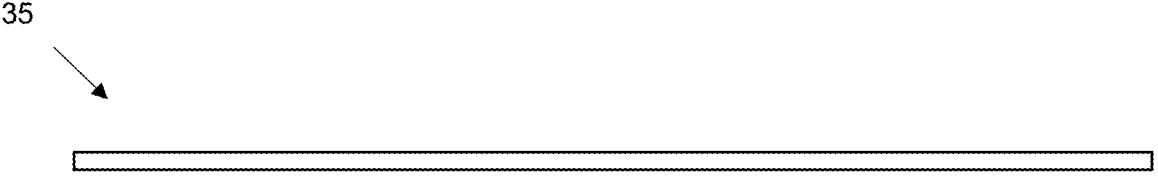
FIG. 5a is a side plan view of a nose insert that can be used with a slow feeder muzzle in accordance with some embodiments of the presently disclosed subject matter.
Figure 5B:
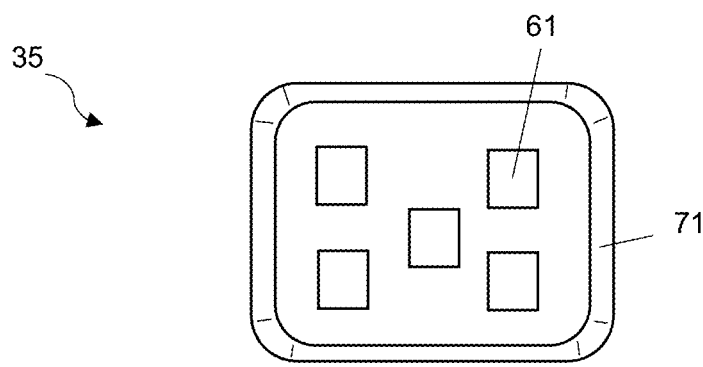
FIG. 5b is a top plan view of a nose insert that can be used with a slow feeder muzzle in accordance with some embodiments of the presently disclosed subject matter.
Figure 5C:
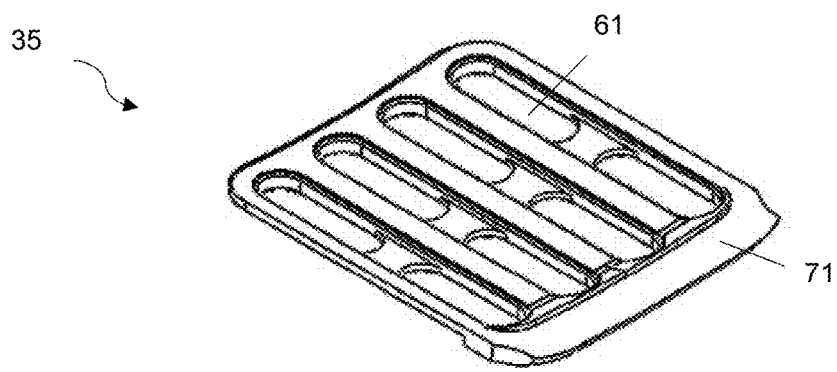
FIG. 5c is a perspective view of an insert comprising a lip that can be used with a slow feeder muzzle in accordance with some embodiments of the presently disclosed subject matter.
Figure 5D:
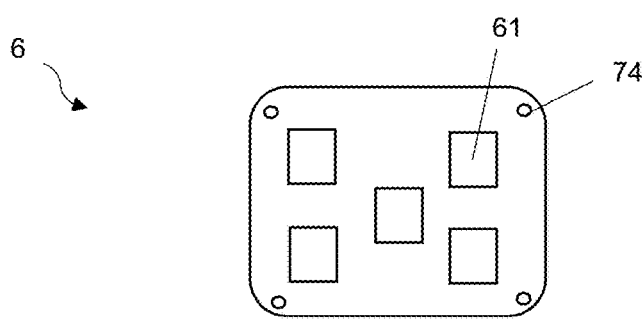
FIG. 5d is a top plan view of an insert comprising screw holes in accordance with some embodiments of the presently disclosed subject matter.

In some embodiments, insert 35 can be flat (e.g., planar) and can take the form of a grid or mesh. The term "flat" as used herein refers to a surface without any significant projections or depressions. FIG. 5a illustrates a side plan view of one embodiment of insert 35 configured in a flat design. As shown, the insert can be about horizontal when resting on a table or other level surface. However, the insert is not limited and can include a curved configuration. In some embodiments, each edge of the insert can include lip 71 as shown in FIG. 5b. The lip can be curved to act as a slightly tapered side wall and provide for more comfortable use by the animal. Alternatively, the lip can appear on a single side of the insert, as shown in FIG. 5c. The lip can be used to position and remove the insert from the muzzle, as described in more detail below.

Optionally, the insert can include one or more screw holes 74 that allow the insert to be releasably attached to the corresponding muzzle flaps. It should be appreciated that in place of the screw holes, any desired element can be used to releasably attach the insert to the flaps, such as (but not limited to) bolts, clips, snaps, magnets, ties, zippers, and the like.

Figure 6:
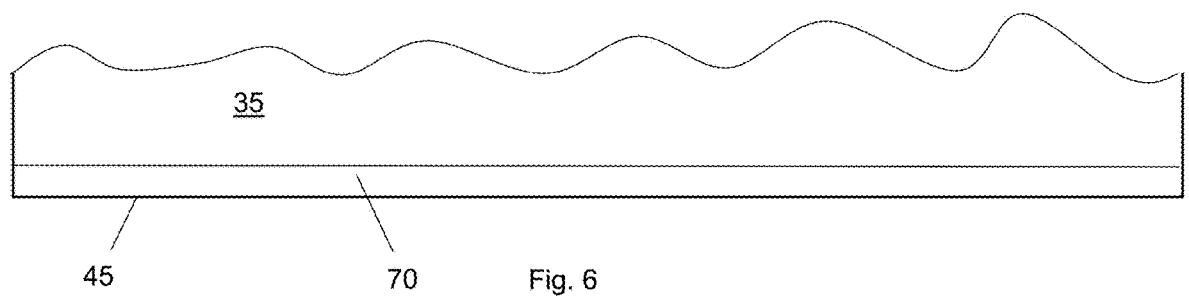
FIG. 6 is a cutaway side plan view of a nose insert in accordance with some embodiments of the presently disclosed subject matter.

At least one edge of insert 35 includes an element to allow releasable connection with one or more flaps, such as (but not limited to) hinges, grooves, interlocking joints, and the like. For example, FIG. 6 illustrates one embodiment of insert bottom edge 45 comprising groove 70 that allows releasable connection with a corresponding element in a flap, as described in more detail below.

Insert 35 can have any desired thickness, such as about 0.01-1 inches. Thus, the insert can have a thickness of about 0.01, 0.05, 0.1, 0.2, 0.3, 0.4, 0.5, 0.6, 0.7, 0.8, 0.9, or 1 inch. However, the presently disclosed subject matter is not limited and the insert can have a thickness greater or smaller than the range set forth herein. In some embodiments, the thickness of the insert is about the same as the thickness of a corresponding flap.

Inserts 35 can be constructed from any desired materials, such as metal, rubber, silicone, fabric, leather, and/or plastic. In some embodiments, the inserts are constructed from a food-grade and/or food safe material, such as stainless steel, low density polyethylene, high density polyethylene, nylon, and the like. The term "food grade" refers to being regarded as safe for human and/or animal consumption, e.g., by the relevant regulatory authorities. The term "food safe" refers to materials that comprised entirely of materials that are considered food grade, and/or Generally Recognized As Safe (GRAS).

Insert 35 can be constructed using any known method, such as (but not limited to) plastic thermoforming, flow molding, welding, pressing, and the like. Further, apertures 61 can be constructed using any conventional method, such as laser cutting, drilling, die cutting, stamping, water jet cutting, carving, or any other suitable process. Such methods are well known in the art.

Figure 7A:
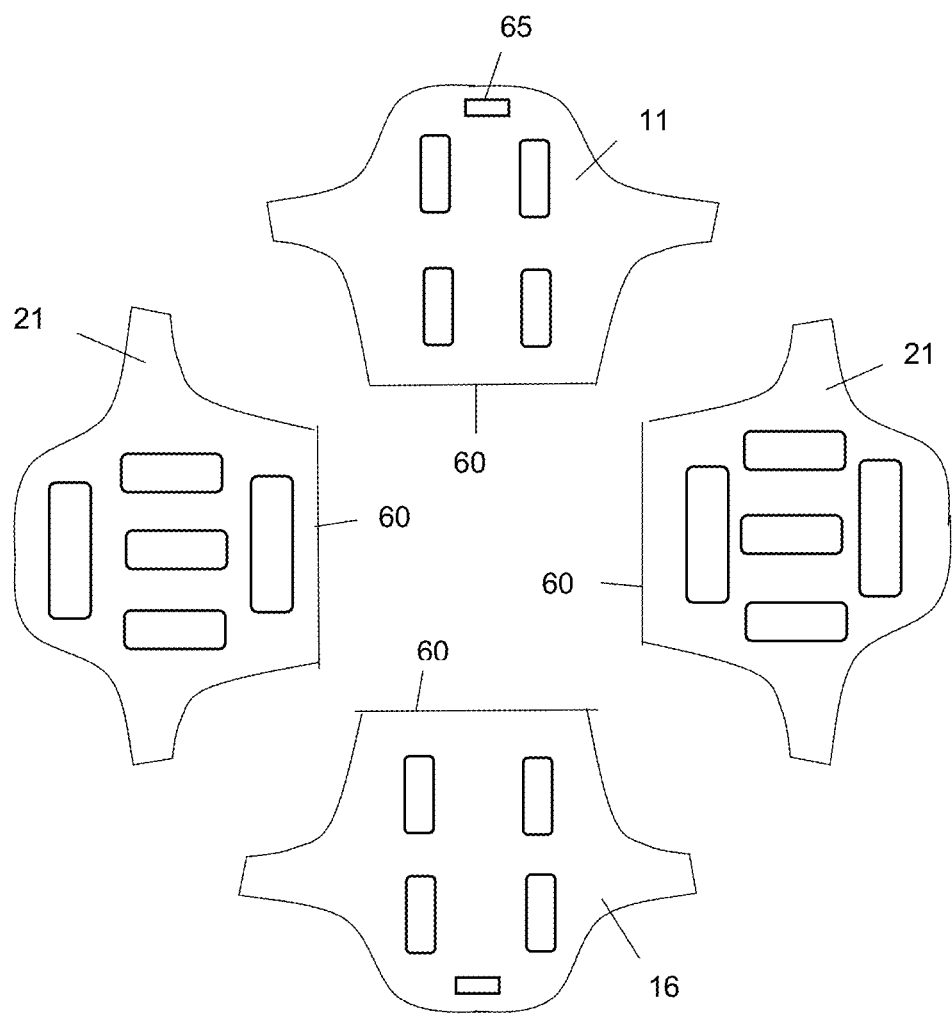
FIG. 7a is a top plan view of a slow feeder muzzle prior to assembly in accordance with some embodiments of the presently disclosed subject matter.
Figure 7B:
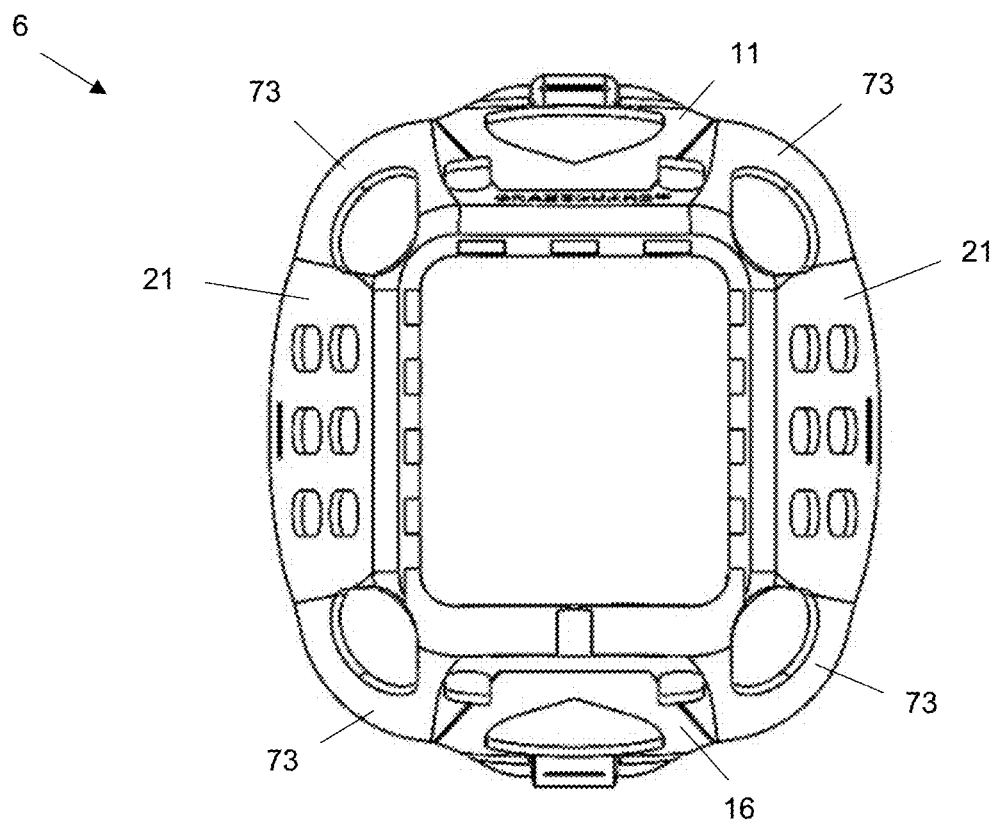
FIG. 7b is a perspective view of a slow feeder muzzle in accordance with some embodiments of the presently disclosed subject matter.

To assemble muzzle 6, flaps 11, 16, and 21 can be positioned such that opposing bottom edges 60 are interfacing, as shown in FIG. 7a. For example, the bottom edges of top and bottom flaps 11, 16 can be about parallel and interfacing, and the bottom edges of side flaps 21 can be about parallel and interfacing. In this way, a central opening is formed, sized and shaped to house insert 35. Alternatively, flaps 11, 16, and 21 can be permanently joined together at connectors 73 positioned between each flap, as shown in FIG. 7b. The flaps can also be joined in the corners at the bottom of the muzzle (e.g., when connectors 73 are pliable). In these embodiments, a lip of material around the central opening can hold the flaps in a particular shape.

A desired insert is then selected based on the animal's nutritional requirements. The insert is releasably attached to at least one flap edge. In some embodiments, the insert is attached to each flap bottom edge. Any connection mechanism can be used, such as (but not limited to) hinges, grooves, snap fit closures, friction fit closures, mechanical closures (clips, bolts, screws, etc.), and the like.

Figure 8A:
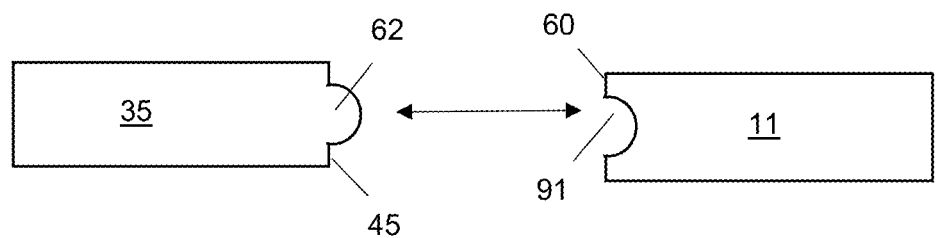
FIG. 8a is a side plan view of a grooved attachment of a nose insert and a corresponding flap in accordance with some embodiments of the presently disclosed subject matter.
Figure 8B:
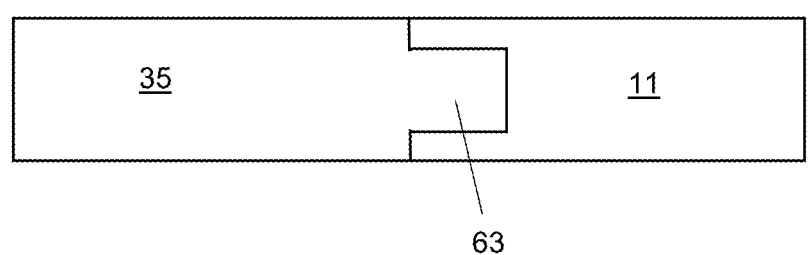
FIG. 8b is a side plan view of a snap fit attachment of a nose insert and a corresponding flap in accordance with some embodiments of the presently disclosed subject matter.
Figure 8C:
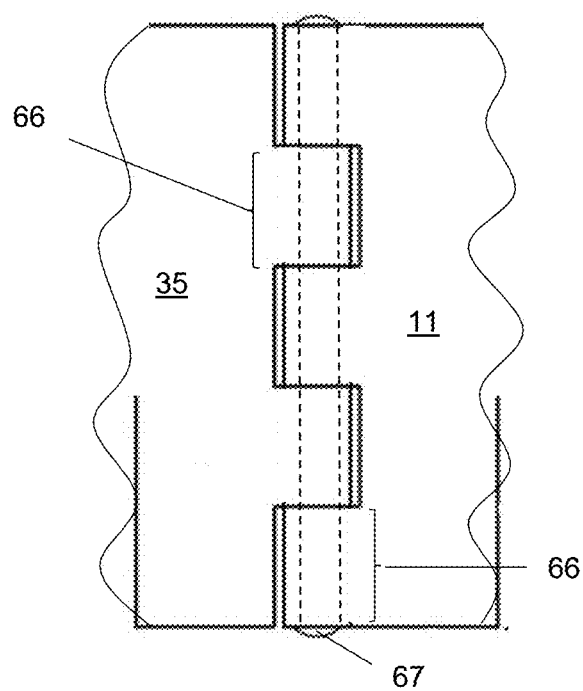
FIG. 8c is a side plan view of a hinge attachment of a nose insert and a corresponding flap in accordance with some embodiments of the presently disclosed subject matter.

For example, in some embodiments, flap bottom edge 60 includes receiving groove 91 that interacts with protrusion 62 on the corresponding insert edge (e.g., insert edge 45), as shown in FIG. 8a. FIG. 8b illustrates one embodiment of a snap-fit attachment, showing an insert edge comprising projection 63 that fits into a corresponding indentation in flap 11 when the insert edge is snap-fit to the flap edge. FIG. 8c illustrates yet another embodiment of a suitable flap-insert connection. Particularly, the flap and insert both include one or more hollow cylindrical hinge body portions 66 that align and are connected via hinge pin 67 that passes therethrough. The disclosed muzzle is not limited to the connection elements shown in FIGS. 8a-8c.

Figure 9:
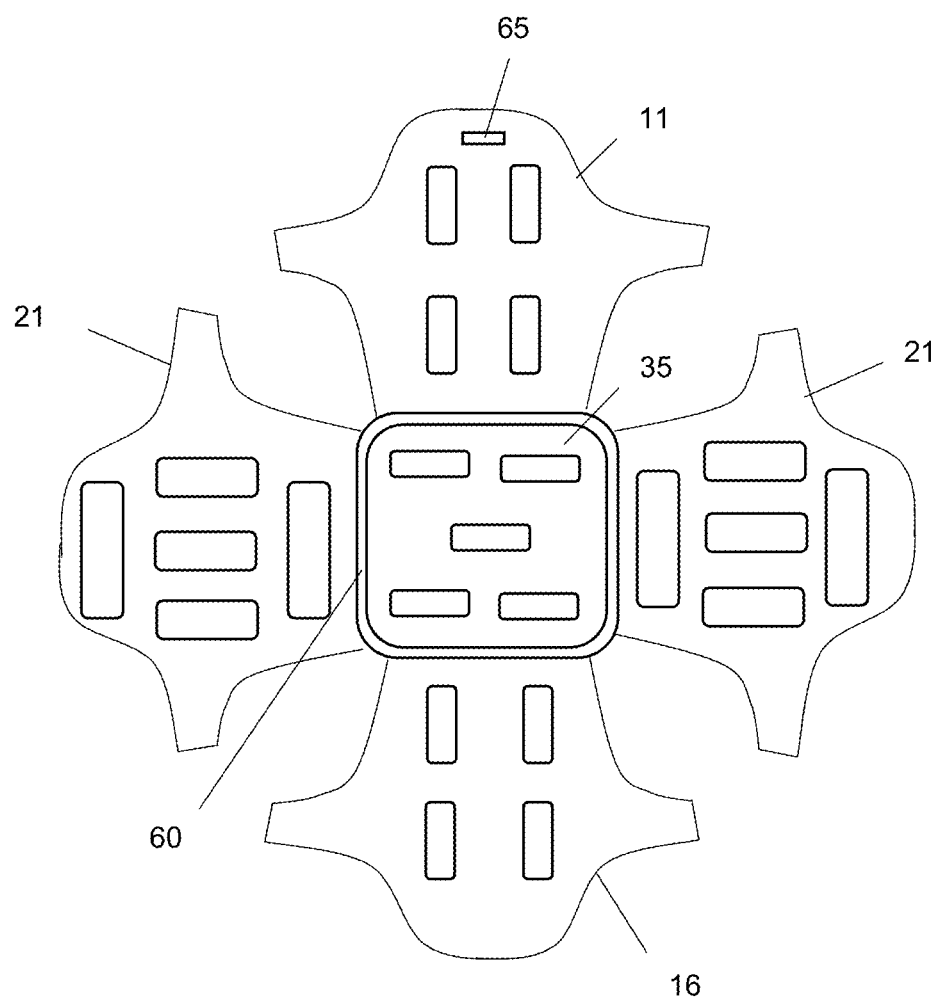
FIG. 9 is a top plan view of a slow feeder muzzle with nose insert attached in accordance with some embodiments of the presently disclosed subject matter.

Thus, in some embodiments, each edge of insert 35 is connected to bottom edge 60 of corresponding flaps 11, 16, and 21, as depicted in FIG. 9. The insert is then considered to be releasably connected to the muzzle flaps. The top edge of each flap is then rotated upward to allow adjacent locking tabs 70 to interconnect, thereby forming a conically or cylindrically shaped muzzle, as shown in FIG. 2.

Figure 10A:
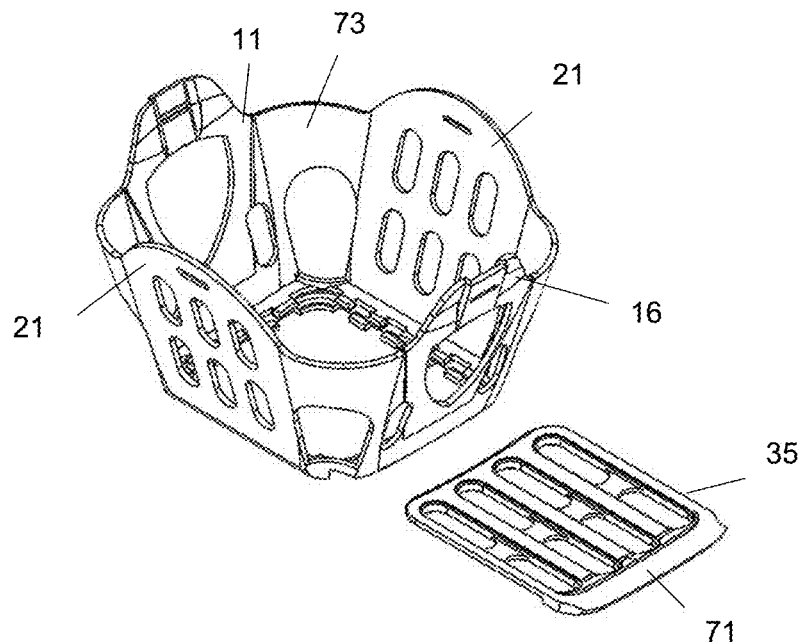
FIGS. 10a-10c are perspective views illustrating a method of positioning an insert in accordance with some embodiments of the presently disclosed subject matter.
Figure 10B:
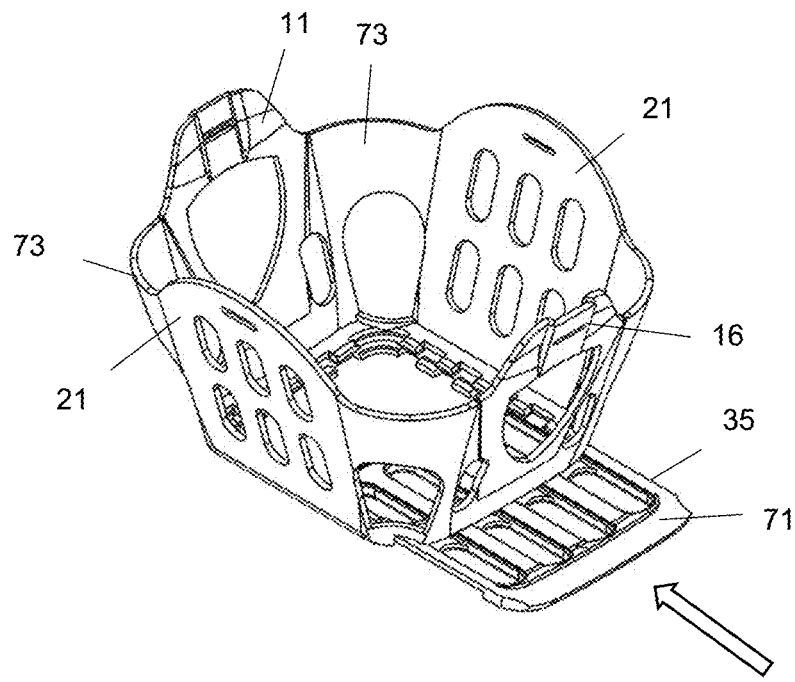
Figure 10C:
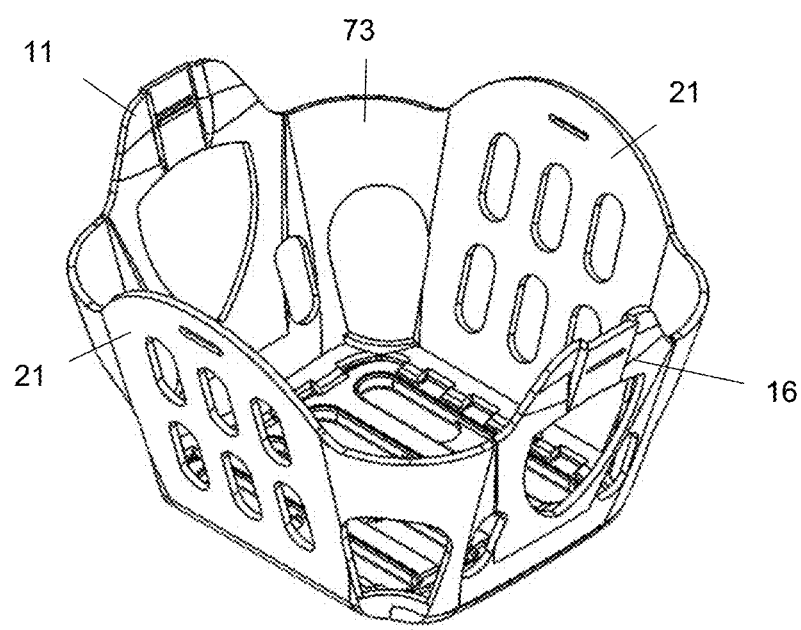

Alternatively, the flaps can be permanently or releasably joined together to form a solid frame as described above. The insert can then be slid or otherwise removably attached within the central opening, as shown in FIGS. 10a-10c. Particularly, a desired insert 35 is selected by the user based on the horse's dietary needs, as illustrated in FIG. 10a. The insert can be received by the bottom edges of at least one flap and slid or otherwise positioned in place within central nose 26, as shown in FIGS. 10b and 10c. In some embodiments, lip 71 of the insert can be used to position and/or remove the insert. For example, the lip can slide into grooves on either side of the central opening. To remove the insert, the user can press down and slide the insert out from the corresponding grooves on the lower edge of the flaps. To replace the insert, a user would simply align the insert back into place and slide down into the central opening to lock it into place.

Figure 11A:
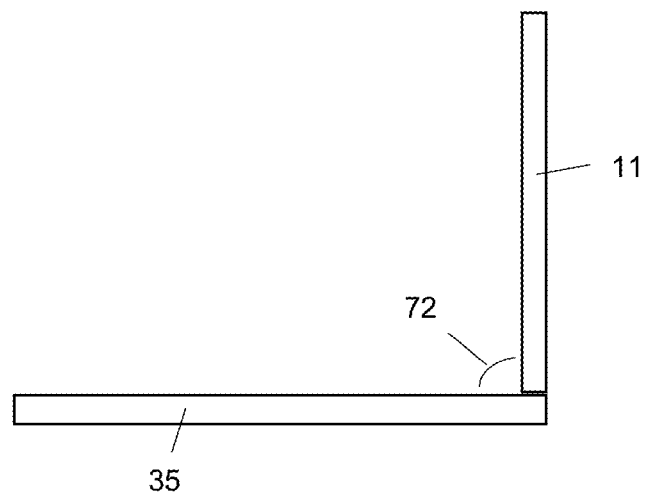
FIGS. 11a and 11b are side plan views illustrating the angle between a nose insert and a flap in accordance with some embodiments of the presently disclosed subject matter.
Figure 11B:
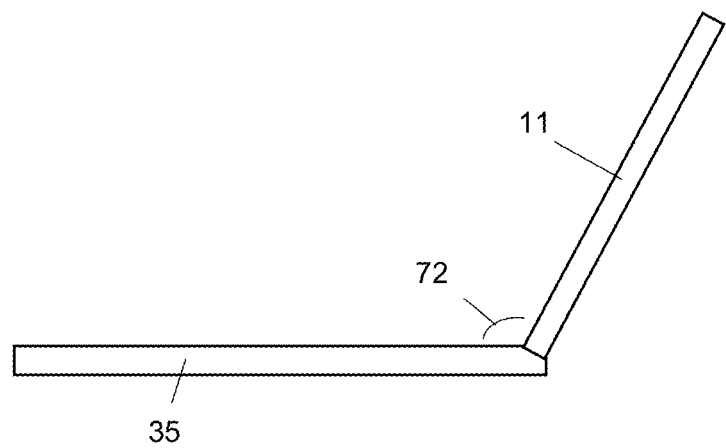

In some embodiments, once assembled, the interior of the muzzle is sized and shaped to accommodate an animal's mouth (e.g., a horse's mouth) and at least a portion of its nose. Particularly, the muzzle can provide a rigid frame into which the insert slides into the bottom, central opening. In some embodiments, angle 72 between insert 35 and each flap is about 90 degrees, forming a cylindrically shaped muzzle as shown in FIG. 11*a*. Alternatively, angle 72 can be greater than 90 degrees to form a conically shaped device, as illustrated in FIG. 11*b*.

In use, the assembled muzzle can be inserted over a horse's nose, such that the animal's mouth is interior to the muzzle and adjacent to insert 35. The muzzle can be adjusted as appropriate using connector 65 attached to a halter or head/ear straps to properly fit the muzzle to the animal. The horse can access food (e.g., grass, hay, or feed) only through apertures 61 in the insert, thereby limiting the amount of grass or feed available for eating. As a result, the animal eats more slowly and ingests a smaller portion of food.

Figure 12A:
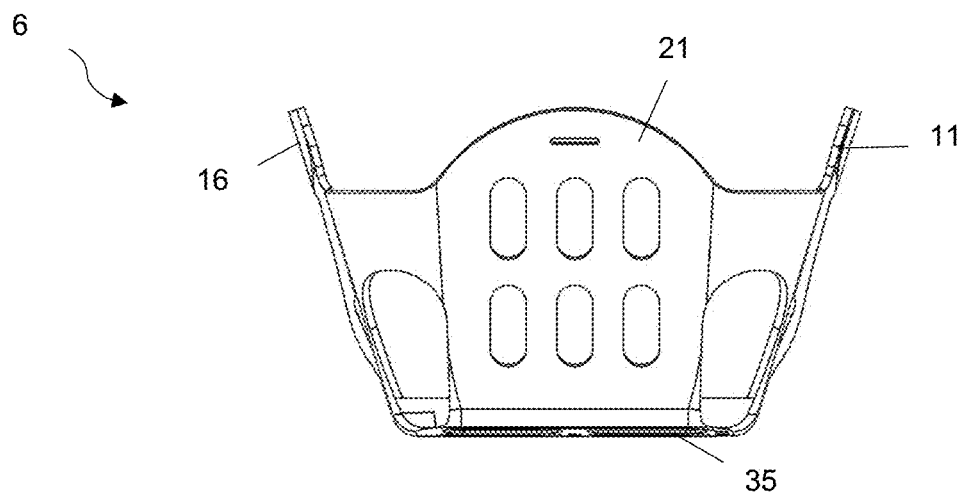
FIGS. 12a-12c are side plan views illustrating a method of positioning an insert in accordance with some embodiments of the presently disclosed subject matter.
Figure 12B:
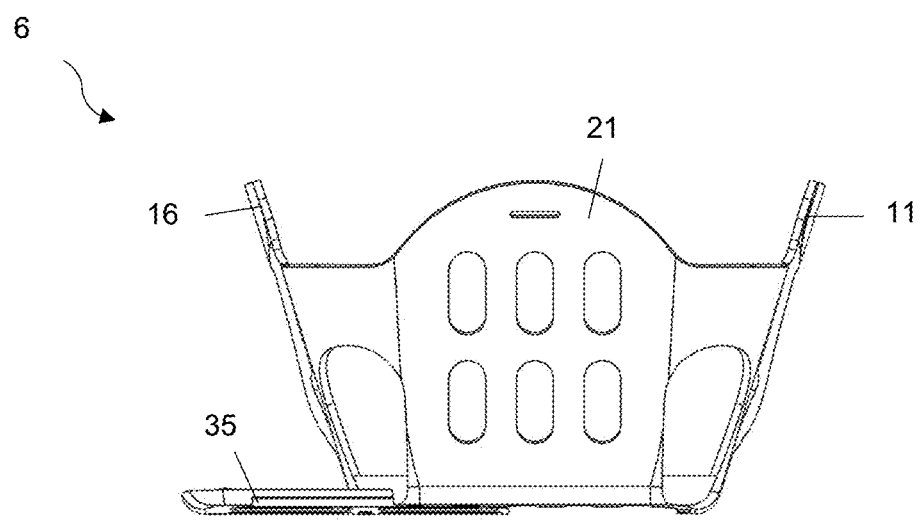
Figure 12C:
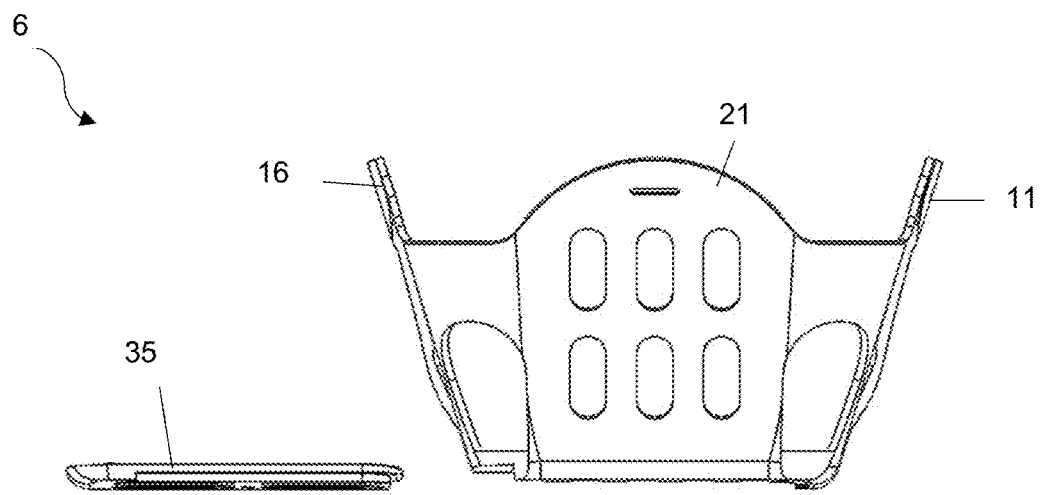

If a user desires to replace the insert, such as in situations when the muzzle is used with a different animal or when the animal's dietary needs have changed, the muzzle can be removed from the animal, if being worn. The muzzle is then unassembled by disconnecting locking tabs 70 and lip 71 from adjacent flaps. The flaps can then be rotated in a downward direction to be substantially flat (e.g., in the same plane as insert 35). The insert can then removed from the flaps by separating the insert edges from bottom edge 60 of each flap. A new insert with a desired aperture pattern is then attached to each flap as described above, and the muzzle is re-assembled. Alternatively, the muzzle flaps can remain assembled together while the insert is removed from the muzzle and replaced with a different insert, as depicted in FIGS. 12*a*-12*c*.

Figure 13A:
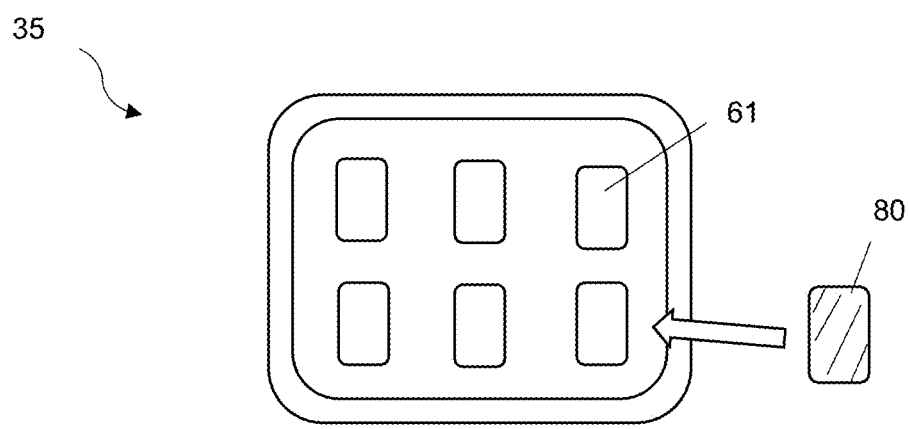
FIGS. 13a and 13b are top plan views illustrating a method of inserting a plug into a nose insert in accordance with some embodiments of the presently disclosed subject matter.
Figure 13B:
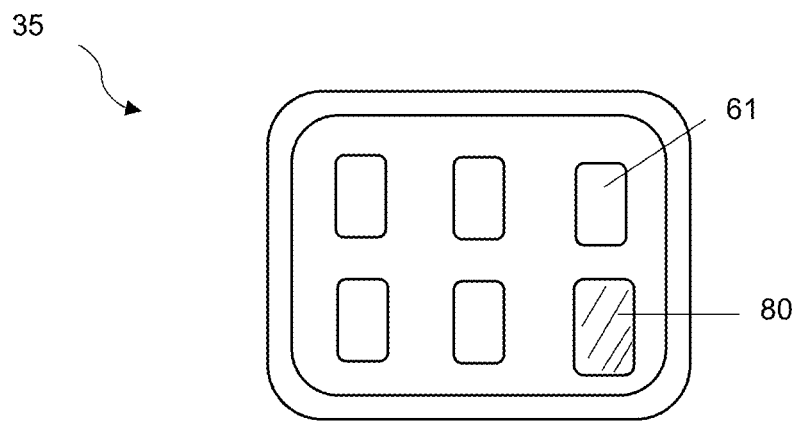

The muzzle can be further customized for a particular animal by blocking one or more apertures in the insert to further restrict access to grass or feed. Particularly, one or more plugs 80 can be inserted into a desired number of insert apertures 61. The term "plug" refers to a structure that partially or fully blocks an insert aperture. As shown in FIGS. 13*a* and 13*b*, plug 80 can be inserted into at least one insert aperture. In this way, the amount of feed that a horse has access to is further restricted.

In some embodiments, at least one insert aperture is blocked via plug 80. In other embodiments, all of the insert apertures can be blocked through the positioning of plugs in each aperture.

Figure 13C:
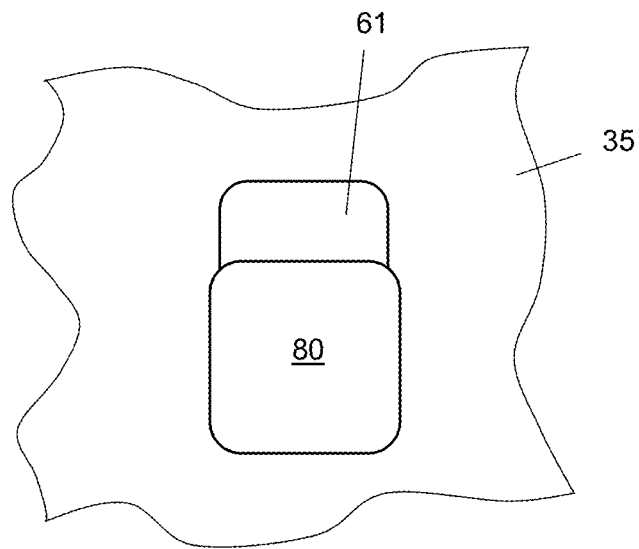
FIG. 13c is a fragmentary view illustrating a plug inserted in a nose insert in accordance with some embodiments of the presently disclosed subject matter.

Plug 80 can be configured in about the same shape and/or size as a corresponding insert aperture to easily but securely block the aperture. However, it should be appreciated that the plug can be configured smaller than aperture 61, such as to allow a small portion of pasture or feed to be accessed, as illustrated in FIG. 13*c*.

Figure 13D:
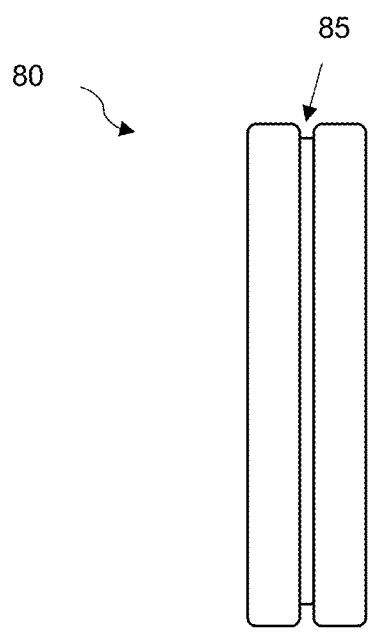
FIG. 13d is a side plan view of a plug comprising a groove positioned about the circumference in accordance with some embodiments of the presently disclosed subject matter.

In some embodiments, each plug can include circumferential ridge 85 positioned about the side of the plug, as shown in FIG. 13*d*. The ridge allows the plug to be secured within each aperture 61. When a user desires to remove the plug, they simply apply pressure to the plug to remove it.

Plug 80 can be constructed from any desired material. For example, the plug can be constructed from rubber, silicone, plastic, or combinations thereof. However, the plug is not limited and can be constructed from any suitable material.

Although described for use with horses, the disclosed muzzle can be used with any suitable animal, such as mules, donkeys, goats, cows, bulls, sheep, dogs, and the like.

Advantageously, muzzle 6 allows the user to customize access to food for a particular animal by selecting a desired insert 35. For example, if a horse is overweight, the owner can use an insert with a limited number of apertures and/or smaller-sized apertures to limit the amount of grass or other feed available to the horse. Once the horse has lost an appropriate amount of weight, the insert can be removed and replaced with a new insert that has larger and/or more apertures. In other examples, the inserts can be selected based on an animal's tendency to overeat or eat too quickly.

In addition to regulating access to the animal's food or grazing, muzzle 6 can also be used to prevent or decrease the likelihood of the animal biting. For example, the muzzle can be used to prevent direct contact with the animal's teeth.

In addition, the muzzle can reduce the incidence of cribbing or wind-sucking. The term "cribbing" refers to behavior wherein a horse grasps a solid object (such as a stall door or a fence rail) with its teeth, arches its neck, and contracts the lower neck muscles to retract the larynx while quickly inhaling. Wind-sucking is a related behavior whereby the horse arches its neck and sucks air into the windpipe but does so without grasping an object.

Muzzle 6 can further deter the ingestion of harmful materials by the animal, such as acorns or other toxic materials.

The disclosed muzzle can decrease harmful chewing behavior by an animal. For example, horses commonly chew or eat wood from their stalls. Muzzle 6 can easily prevent or deter such destructive behavior.

The disclosed muzzle is also highly portable, allowing the user to maintain a single muzzle that is adaptable to a number of different horses. In this way, muzzle 6 offers a cost savings to the owner, preventing the purchase of several different muzzles, each with a different nose aperture pattern.

Muzzle 6 is also very simple in construction and easy to use, even for children and the elderly.

The disclosed muzzle further assists in weight management for the animal. Particularly, the muzzle encourages the animal to move more while grazing or feeding which burns additional calories.

Further, the muzzle helps prevent the onset of insulin resistance in the animal. Specifically, when a horse eats too much rich pasture (which is high in soluble carbohydrates), horse's blood glucose and insulin levels can be raised. Over time, the horse can become insulin resistant which can lead to serious conditions, such as laminitis.

The foregoing descriptions have been presented for purposes of illustration and description and are not intended to be exhaustive or to limit the presently disclosed subject matter. Many modifications and variations are possible in light of the present disclosure.

What is claimed is:
1. A slow feeding muzzle for an animal comprising:
   a plurality of flaps, each flap comprising:
      a main body;
      a top edge, a bottom edge, and opposing side edges;
   connectors positioned between the side edges of each flap to join adjacent flaps together;
   an open nose configured adjacent to the bottom edges of the flaps;
   a plurality of interchangeable inserts sized and shaped such that a single insert fits within the open nose, wherein each insert comprises a top edge, bottom edge and opposing side edges and a main body that includes one or more apertures;

wherein each flap bottom edge is releasably connectable to a corresponding insert bottom edge to allow the insert to be attached and removed on demand.

2. The muzzle of claim 1, wherein the animal is selected from a horse, donkey, mule, goat, sheep, dog, cow, or bull.

3. The muzzle of claim 1, wherein at least one flap comprises one or more openings that pass through the main body of the flap.

4. The muzzle of claim 1, wherein the bottom edge of at least one flap comprises a hinge, groove, interlocking joint, clasp, clip, or tie that releasably connects with at least one edge of the insert.

5. The muzzle of claim 1, wherein the inserts are constructed from one or more food safe materials, selected from aluminum, stainless steel, low density polyethylene, thermoplastic material, rubber, silicone, or combinations thereof.

6. The muzzle of claim 1, wherein the connectors are constructed from a flexible material.

7. The muzzle of claim 1, wherein at least one insert comprises a lip extending around at least a portion of the perimeter of the main body.

8. The muzzle of claim 1, wherein at least one edge of the insert comprises a hinge, groove, interlocking joint, clasp, clip, or tie.

9. The muzzle of claim 6, wherein the apertures vary with regard to shape, size, or both.

10. A kit comprising:
a slow feeder muzzle, the muzzle comprising:
a plurality of adjoined flaps, each flap comprising a top edge, a bottom edge, opposing side edges, and a main body;
a plurality of connectors, each joining two adjacent flaps;
wherein the adjoined flaps provide an open nose configured adjacent to the bottom edges of the flaps;
a plurality of interchangeable inserts sized and shaped to fit within the open nose, wherein each insert comprises a top edge, bottom edge and opposing side edges and a main body that includes one or more apertures;
wherein each flap bottom edge is releasably attachable to a corresponding insert edge to allow the insert to be attached and removed from the open nose on demand.

11. The kit of claim 10, wherein the inserts are constructed from one or more food safe materials, selected from aluminum, stainless steel, low density polyethylene, thermoplastic, silicone, or combinations thereof.

12. The kit of claim 10, wherein at least one edge of the insert comprises a hinge, groove, interlocking joint, clasp, clip, or tie.

13. The kit of claim 10, wherein the connectors are constructed from a flexible material.

14. The kit of claim 10, wherein at least one flap comprises one or more openings that pass through the main body.

15. The kit of claim 10, further comprising one or more plugs that releasably fit within at least one insert aperture.

16. A method of adjusting the amount of food accessible to an animal, the method comprising:
inserting a slow feeder muzzle on the animal, wherein the muzzle comprises:
a plurality of flaps, each flap comprising:
a top edge, a bottom edge, and opposing side edges; and
a main body;
a plurality of connectors, wherein each connector joins two adjacent flaps at the flap side edges;
an interchangeable insert comprising a top edge, bottom edge and opposing side edges and a main body that includes one or more apertures, wherein each edge of the insert releasably attaches to a bottom flap edge to allow the insert to be attached and removed on demand;
allowing the animal to feed, wherein the amount of food accessible to the animal is determined by the number, size, shape, and position of the apertures in the insert;
wherein the amount of food accessible to the animal can be adjusted by interchanging inserts with a desired aperture pattern.

17. The method of claim 16, wherein the bottom edge of each flap comprises a hinge, groove, interlocking joint, clasp, clip, or tie.

18. The method of claim 16, wherein at least one flap comprises one or more openings that pass through the main body.

19. The method of claim 16, wherein the inserts are constructed from one or more food safe materials, selected from aluminum, stainless steel, low density polyethylene, thermoplastic, rubber, silicone, or combinations thereof.

20. The method of claim 16, wherein the connectors are constructed from a flexible material.

* * * * *